US012602105B2

(12) United States Patent 
Bi et al.

(10) Patent No.: US 12,602,105 B2 
(45) Date of Patent: Apr. 14, 2026

(54) SYSTEMS AND METHODS FOR RENDERING AUGMENTED REALITY CONTENT

(71) Applicant: GOOGLE LLC, Mountain View, CA (US)

(72) Inventors: Dongsheng Bi, Fremont, CA (US); Xiaoping Xie, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/429,637

(22) Filed: Feb. 1, 2024

(65) Prior Publication Data

US 2025/0251786 A1 Aug. 7, 2025

(51) Int. Cl.
| | |
|---|---|
| *G06F 3/01* | (2006.01) |
| *G06T 3/18* | (2024.01) |
| *G06T 11/00* | (2006.01) |
| *G09G 3/00* | (2006.01) |

(52) U.S. Cl.
CPC ............... *G06F 3/012* (2013.01); *G06T 3/18* (2024.01); *G06T 11/00* (2013.01); *G09G 3/001* (2013.01); *G06T 2210/12* (2013.01); *G06T 2210/52* (2013.01); *G09G 2340/0435* (2013.01); *G09G 2354/00* (2013.01)

(58) Field of Classification Search
CPC . G06F 3/012; G06T 3/18; G06T 11/00; G06T 2210/12; G06T 2210/52; G09G 2340/0435
See application file for complete search history.

(56) References Cited

U.S. PATENT DOCUMENTS

| | | | | |
|---|---|---|---|---|
| 10,446,119 | B1 * | 10/2019 | Lakshmikantha | ..... G09G 3/003 |
| 2015/0310814 | A1 * | 10/2015 | Umekida | ........... H04N 21/4402 |
| | | | | 345/88 |
| 2015/0379770 | A1 | 12/2015 | Haley et al. | |
| 2017/0200315 | A1 | 7/2017 | Lockhart | |
| 2018/0284876 | A1 | 10/2018 | Ray et al. | |
| 2020/0292825 | A1 * | 9/2020 | Grundhoefer | ...... G02B 27/0179 |
| 2020/0341545 | A1 | 10/2020 | Babu et al. | |
| 2021/0165229 | A1 * | 6/2021 | Stahl | ................... G06F 3/04815 |
| 2022/0129066 | A1 * | 4/2022 | Zahnert | ................... G06F 3/012 |

(Continued)

FOREIGN PATENT DOCUMENTS

WO WO-2023211803 A1 * 11/2023

OTHER PUBLICATIONS

Nguyen, Thanh Cong, et al., "Selective Timewarp Based on Embedded Motion Vectors for Interactive Cloud Virtual Reality", IEEE Access; Digital Object Identifier 10.1109/ACCESS.2018.2888700; vol. 7;, 2019, pp. 3031-3045.

*Primary Examiner* — Liliana Cerullo
(74) *Attorney, Agent, or Firm* — Brake Hughes Bellermann LLP

(57) ABSTRACT

A display is disclosed that can receive a process world-locked content and head-locked content for a mixed reality device differently. The Head-locked content, which are not latency sensitive can be buffered at the display at a slower update rate than the world-locked content and can be displayed at a much lower refresh rate. Treating the content separately can help an augmented reality device save power by only having to perform late stage reprojection on the world-locked content.

19 Claims, 7 Drawing Sheets

(56)                    References Cited

U.S. PATENT DOCUMENTS

2023/0128288  A1*    4/2023  Lansel ................... G06T 3/4007
                                                  345/629
2023/0281898  A1     9/2023  Ray
2024/0404230  A1*   12/2024  Brooks ............... G02B 27/017

* cited by examiner

RECEIVING A FIRST STREAM OF DATA CORRESPONDING TO WORLD-LOCKED CONTENT

RECEIVING A SECOND STREAM OF DATA CORRESPONDING TO HEAD-LOCKED CONTENT

GENERATING A MASK SPECIFYING AN AREA OF THE HEADS-UP DISPLAY CORRESPONDING TO THE HEAD-LOCKED CONTENT

CONTROLLING PIXELS IN THE AREA DIFFERENTLY THAN PIXELS NOT IN THE AREA.

610

620

630

640

600

SYSTEMS AND METHODS FOR RENDERING AUGMENTED REALITY CONTENT

FIELD OF THE DISCLOSURE

The present disclosure relates to a display and more specifically to a heads-up display suitable for use in a mixed-reality device.

BACKGROUND

A heard-worn, mixed-reality device, such as augmented reality glasses may include a heads-up display configured to present content, such as images, graphics, and/or text so that they appear superimposed on the environment, which the user is viewing. Some content can be positioned and displayed (i.e., rendered) on the heads-up display so that it appears locked to a position in the environment, even as the user moves. This content, known as world-locked content, may provide a user with information that is correlated to a position/item/person in the environment. Some content, however, can be rendered at a fixed position on the display regardless of the movement of the user. This content, known as head-locked, may provide the user with information that may be uncorrelated with the environment.

SUMMARY

A display is disclosed that can receive and display head-locked content and world-locked content separately.

In some aspects, the techniques described herein relate to a heads-up display including: a pixel array; a first input configured to receive a first stream of data corresponding to world-locked content, the world-locked content configured to change on the heads-up display based on a movement of the heads-up display; and a second input configured to receive a second stream of data corresponding to head-locked content, the head-locked content configured to not change on the heads-up display based on the movement of the heads-up display.

In some aspects, the techniques described herein relate to a method for displaying on a heads-up display: receiving a first stream of data corresponding to world-locked content at the heads-up display, the world-locked content configured to change on the heads-up display based on a movement of the heads-up display; receiving a second stream of data corresponding to head-locked content at the heads-up display, the head-locked content configured to not change on the heads-up display based on the movement of the heads-up display; generating a mask specifying an area of the heads-up display corresponding to the head-locked content; and controlling pixels in the area differently than pixels not in the area.

In some aspects, the techniques described herein relate to augmented reality device including: an inertial measurement unit track a movement of a user; a processor configured to: receive head-locked content and world-locked content; and a heads-up display configured to: receive a first stream of data corresponding to warped world-locked content from the processor; receiving a second stream of data corresponding to the head-locked content from the processor; generating a mask specifying an area on the heads-up display corresponding to the head-locked content; and controlling pixels in the area differently than pixels not in the area.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A user may view the world through a heads-up display. For example, in a possible implementation, a heads-up display may be used in a vehicle (e.g., car, airplane) to provide guidance and operating information. In another possible implementation, a heads-up display can be used with a head-mounted device to provide a user with virtual information displayed with the world seen through the display. In these applications, the heads-up display, which may be referred to as a head-mounted display, view-through display, or the like, can provide a mixed reality (e.g., augmented reality, extended reality, etc.) experience.

A mixed reality device includes a heads-up display (i.e., HUD) that can display augmented reality (i.e., AR) content designated as world-locked (i.e., WL) content or head-locked (i.e., HL) content. World-locked content can require more resources because it is refreshed (i.e., updated) as a user moves. Head-locked content can require fewer resources because it is presented at a fixed location on the display, regardless of the user's movement. Conventional heads-up displays receive one data stream that includes both head-locked content and world-locked content together.

One technical problem facing these conventional heads-up displays is that the same resources applied to world-locked content are also applied to head-locked content, which is wasteful, especially in a mixed-reality device that has limited resources, such as AR glasses. The disclosed display provides at least one technical solution to this problem by displaying world-locked content and head-locked content differently. This may provide the technical effect of, at least, reducing the processing and/or power (i.e., resources) required for displaying virtual content on a mixed reality device. Reducing the resources used by the HUD on AR glasses may extend the operating time of the AR glasses on a single charge.

Figure 1:
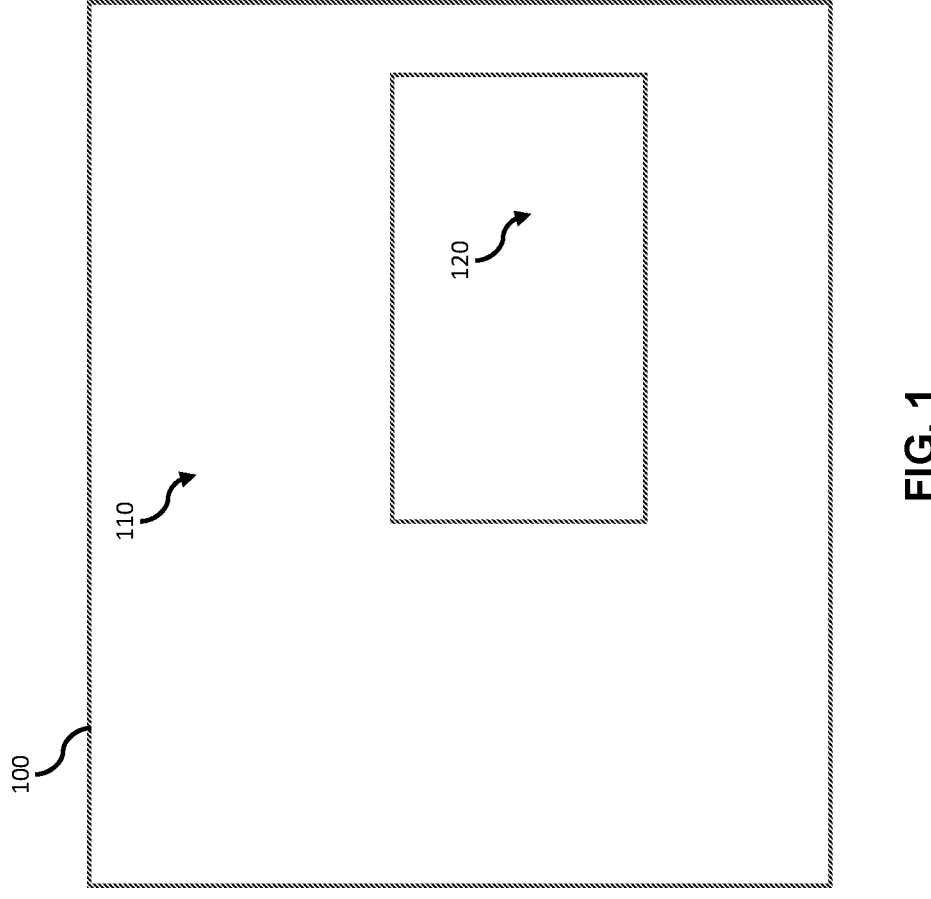
FIG. 1 is a pixel array including areas designated for world-locked contents and head-locked contents according to a possible implementation of the present disclosure.

FIG. 1 is a pixel array including areas designated for world-locked content and head-locked content according to a possible implementation of the present disclosure. The pixel array 100 includes pixels (e.g., micro light emitting diodes) arranged in rows and columns. The pixels in the pixel array can be illuminated at different intensities to display content. In a possible implementation of the present disclosure, each pixel of the pixel array can be controlled (i.e., driven) independently rather than using a conventional row/column address scheme. This added control can allow for areas of pixels of the display to be designated (i.e., specified) and controlled differently.

As shown in FIG. 1, the pixel array 100 includes a first area 110 in which world-locked content can be displayed and a second area 120 in which head-locked content can be displayed. The specification of areas is virtual and can be updated based on the content displayed. For example, the update can be triggered by an application. The areas may be designated in multiple layers, such as a foreground layer and a background layer. The layers may be additive and shared pixels in overlapping layers may be combined. The combination may be adjusted based on a transparency level assigned to one of the layers. Accordingly, the first area 110 and the second area 120 may function as partitions of pixels.

In a possible implementation, all pixels in the pixel array 100 may be controlled as world-locked content unless specified otherwise. In other words, by default the first area 110 may occupy the entire pixel array 100. A mask may be generated to designate the second area 120. The mask may include a set of array locations that specify a (virtual) bounding box that includes the pixels of the second area 120. Control of the pixels in the pixel array may be altered from a default control by the bounding box.

The mask may be generated to include head-locked content displayed on the pixel array 100. Pixels within the bounding box of the mask may include more pixels than necessary to include the head-locked content. For example, if the head-locked content is an icon, then the bounding box may contain the icon and further include pixels surrounding the icon.

The second area 120 for head-locked content can be any size or shape. For example, the second area 120 may be a frame that surrounds the first area 110, or a bar running on one side of the first area 110.

Figures 2A, 2B:
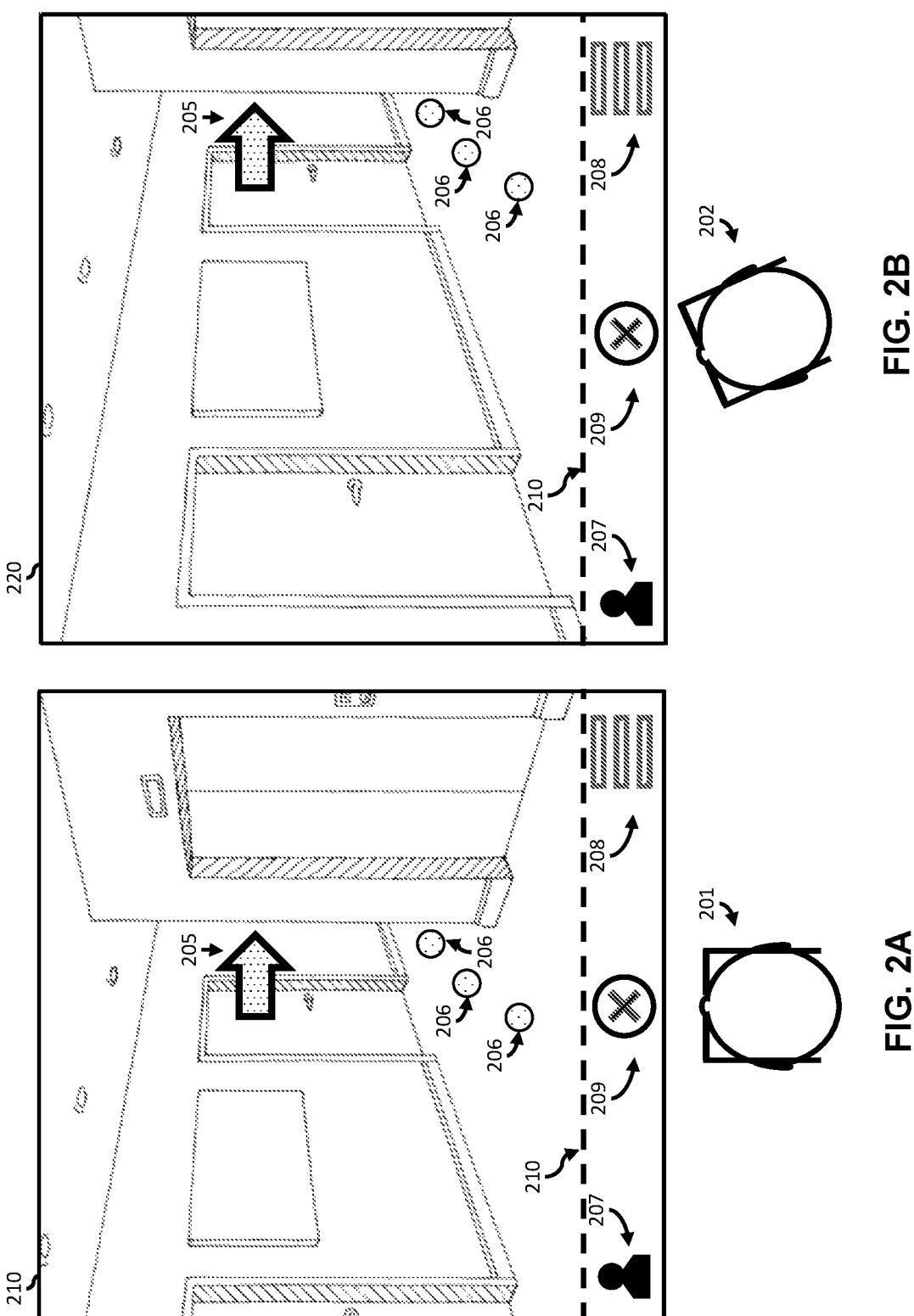
FIG. 2A is a first view of an environment through a heads-up display configured for augmented reality according to a possible implementation of the present disclosure.
FIG. 2B is a second view of an environment through a heads-up display configured for augmented reality according to a possible implementation of the present disclosure.

FIG. 2A is a first view of an environment through a heads-up display configured for augmented reality according to a possible implementation of the present disclosure. The first view 210 viewed by a user through a heads-up display of an augmented reality device (e.g., AR glasses) worn on the head of the user. Accordingly, the first view is determined from a position (i.e., x, y, z) and/or orientation (i.e., yaw, pitch, roll) of the user's head. The combination of position and orientation can be referred to as the pose of the user's head. For the first view 210 the user's head is in a first pose 201.

FIG. 2B is a second view of the environment through the heads-up display configured for augmented reality according to the possible implementation of the present disclosure. For the second view 220, the user's head is in a second pose 202. The field of view changes between the first view 210 and the second view 220 as the user turns his/her head.

In FIGS. 2A-2B the user observes an environment through AR glasses while interacting with an AR navigation application. The AR navigation application is configured to display world-locked content to help the user navigate to a destination. For example, the world-locked content may include an arrow graphic 205. The arrow graphic 205 may be displayed on the heads-up display as if it points towards a hallway in the real-world environment. The world-locked content of the AR navigation application may further include virtual path markers 206. The virtual path markers 206 may be displayed on the heads-up display as if they are arranged along a path around a corner towards the hallway. By following the world-locked content, the user can navigate to the destination. The world-locked content is displayed on the heads-up display at different positions in the first view 210 and the second view 220. The different positions of the world-locked content on the head-up display correspond to a change between the first pose 201 and the second pose 202 of the user. As shown, the world-locked content may shift closer to the right side of the heads-up display as the user's head is rotated to the left.

The AR navigation application illustrated in FIGS. 2A-2B, is further configured to display head-locked content to help the user interact with the application. As shown, the head-locked content includes a user icon 207 displayed in a first position near the lower left corner of the heads-up display; a file icon 208 displayed in a second position near the lower right corner of the heads-up display; and an exit icon 209 displayed at a third position between the first position and the second position. The head-locked content may be part of a user interface for the AR navigation application. The head-locked content is displayed on the heads-up display at the same positions in the first view 210 and the second view 220. In other words, the display of the head-locked content is unchanged as the user's head is rotated to the left.

Refreshing the heads-up display for the world-locked content can be made at a world-locked frame rate that is fast enough to follow the user's movements without a noticeable lag. Refreshing the heads-up display for the head-locked content can be at a head-locked frame rate that is slower than the user's movement without any noticeable degradation in quality. As a result, an area 210 on the heads-up display may be specified for head-locked content. In this area, the refresh rate (i.e., frame rate) may be reduced, as compared to the refresh rate for the portion of the heads-up display that is outside the area 210.

Figure 3:
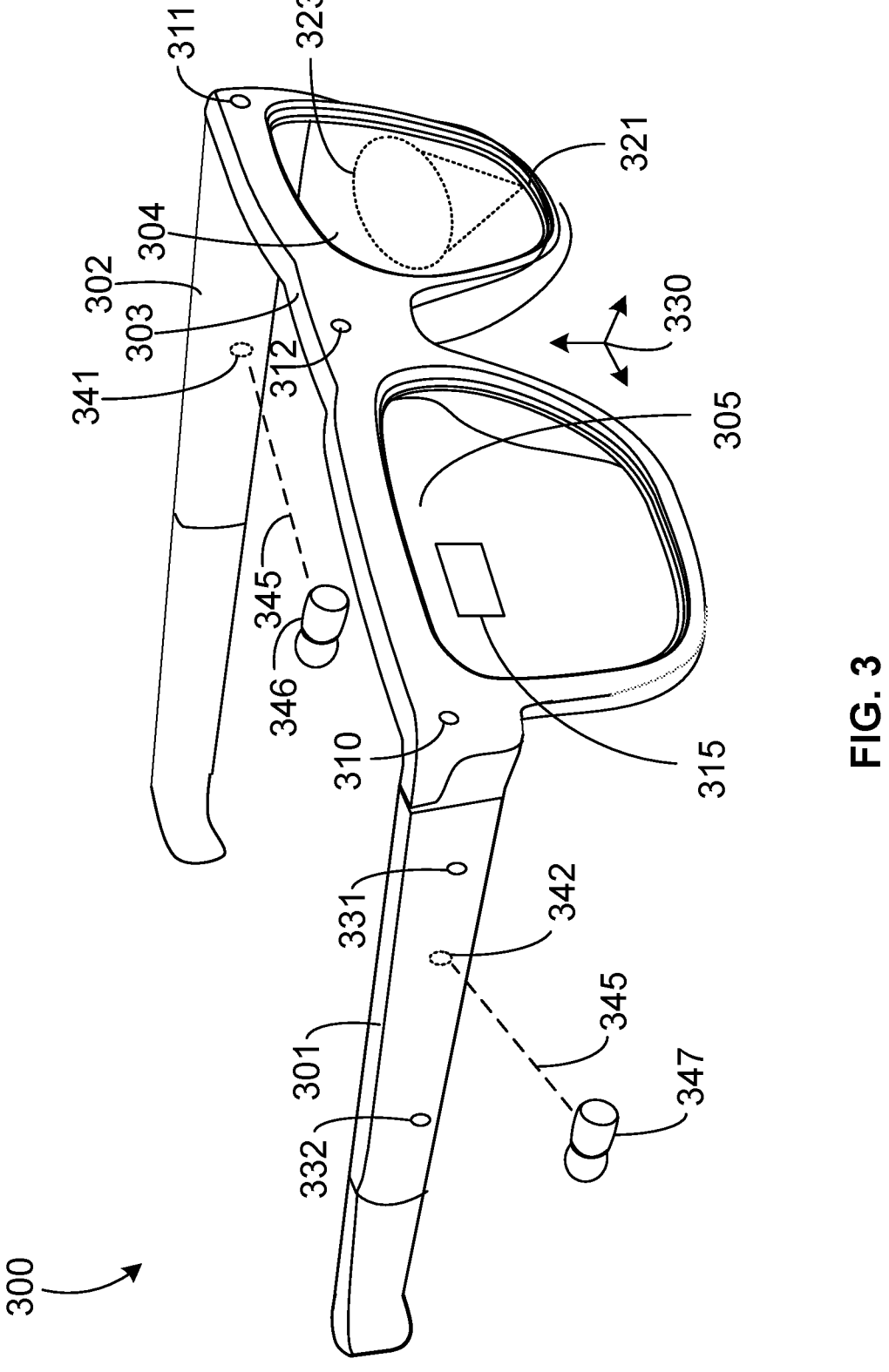
FIG. 3 is a perspective view of an augmented-reality device according to a possible implementation of the present disclosure.

FIG. 3 is a perspective view of a mixed-reality device according to a possible implementation of the present disclosure. As shown, the mixed-reality device may be implemented as smart glasses (i.e., AR glasses). The AR glasses 300 can be configured to be worn on the head and face of a user. The AR glasses 300 include a right earpiece 301 and a left earpiece 302 that are supported by the ears of a user. The AR glasses 300 further include a bridge portion 303 that is supported by the nose of the user so that a left lens 304 and a right lens 305 can be positioned in front a left eye of the user and a right eye of the user respectively. The portions of the AR glasses 300 can be collectively referred to as the frame of the AR glasses. The frame of the AR glasses can contain electronics to enable function. For example, the frame may include a battery, a processor (e.g., system on a chip), a memory (e.g., non-transitory computer readable medium), imaging sensors (e.g., cameras, depth sensors, etc.), at least one position sensor (e.g., an inertial measurement unit) and interface devices (e.g., speakers, display, network adapter, etc.). The AR glasses may display and sense an environment relative to a coordinate system 330. The coordinate system 330 can be aligned with the head of a user wearing the AR glasses. For example, the eyes of the user may be along a line in a horizontal (e.g., LEFT/RIGHT, X-axis) direction of the coordinate system 330.

A user wearing the AR glasses 300 can experience information displayed in an area corresponding to the lens (or lenses) so that the user can view virtual elements within the user's natural field of view. Accordingly, the AR glasses 300 can further include a heads-up display 315 (i.e., HUD) configured to display visual information at a lens (or lenses) of the AR glasses. As shown, the heads-up display 315 may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment. In a possible implementation, the portion of the lens occupied by the heads-up display 315 can correspond to (i.e., substantially match) area(s) of the right lens 305 and/or left lens 304.

The AR glasses 300 can include an IMU that is configured to track motion of the head of a user wearing the AR glasses. The IMU may be disposed within the frame of the AR glasses and aligned with the coordinate system 330 of the AR glasses 300.

The AR glasses 300 can include a first camera 310 that is directed to a first camera field-of-view that overlaps with the natural field-of-view of the eyes of the user when the glasses are worn. In other words, the first camera 310 (i.e., world-facing camera) can capture images of a view aligned with a point-of-view (POV) of a user (i.e., an egocentric view of the user).

In a possible implementation, the AR glasses 300 can further include a depth sensor 311. The depth sensor 311 may be implemented as a second camera that is directed to a second field-of-view that overlaps with the natural field-of-view of the eyes of a user when the glasses are worn. The second camera and the first camera 310 may be configured to capture stereoscopic images of the field of view of the user that include depth information about objects in the field of view of the user. The depth information may be generated using visual odometry and used as part of the camera measurement corresponding to the motion of the augmented-reality device. In other implementations the depth sensor 311 can be implemented as another type of depth (i.e., range) sensing device, including (but not limited to) a structured light depth sensor or a lidar depth sensor. The depth sensor 311 can be configured to capture a depth image corresponding to the field-of-view of the user. The depth image includes pixels having pixel values that correspond to depths (i.e., ranges) to objects measured at positions corresponding to the pixel positions in the depth image.

In a possible implementation, the AR glasses 300 can further include an illuminator 312 to help the imaging and/or depth sensing. For example, the illuminator 312 can be implemented as an infra-red (IR) projector configured to transmit IR light (e.g., near-infra-red light) into the environment of the user to help the first camera 310 capture images and/or the depth sensor 311 to determine a range of an object.

The AR glasses 300 can further include an eye-tracking sensor. The eye tracking sensor can include a right-eye camera and/or a left-eye camera 321. As shown, a left-eye camera 321 can be located in a portion of the frame so that a left FOV 323 of the left-eye camera 321 includes the left eye of the user when the AR glasses are worn.

The AR glasses 300 can further include one or more microphones. The one or more microphones can be spaced apart on the frames of the AR glasses. As shown in FIG. 3, the AR glasses can include a first microphone 331 and a second microphone 332. The microphones may be configured to operate together as a microphone array. The microphone array can be configured to apply sound localization to determine directions of the sounds relative to the AR glasses.

The AR glasses may further include a left speaker 341 and a right speaker 342 configured to transmit audio to the user. Additionally, or alternatively, transmitting audio to a user may include transmitting the audio over a wireless communication link 345 to a listening device (e.g., hearing aid, earbud, etc.). For example, the AR glasses may transmit audio to a left wireless earbud 346 and to a right earbud 347.

The AR glasses may be communicatively coupled to a computing device, such as a tablet or a mobile phone. Accordingly, the processing required to display content on the heads-up display 315 of the AR glasses 300 may be split between processing of the AR glasses 300 and processing of the computing device.

Figure 4:
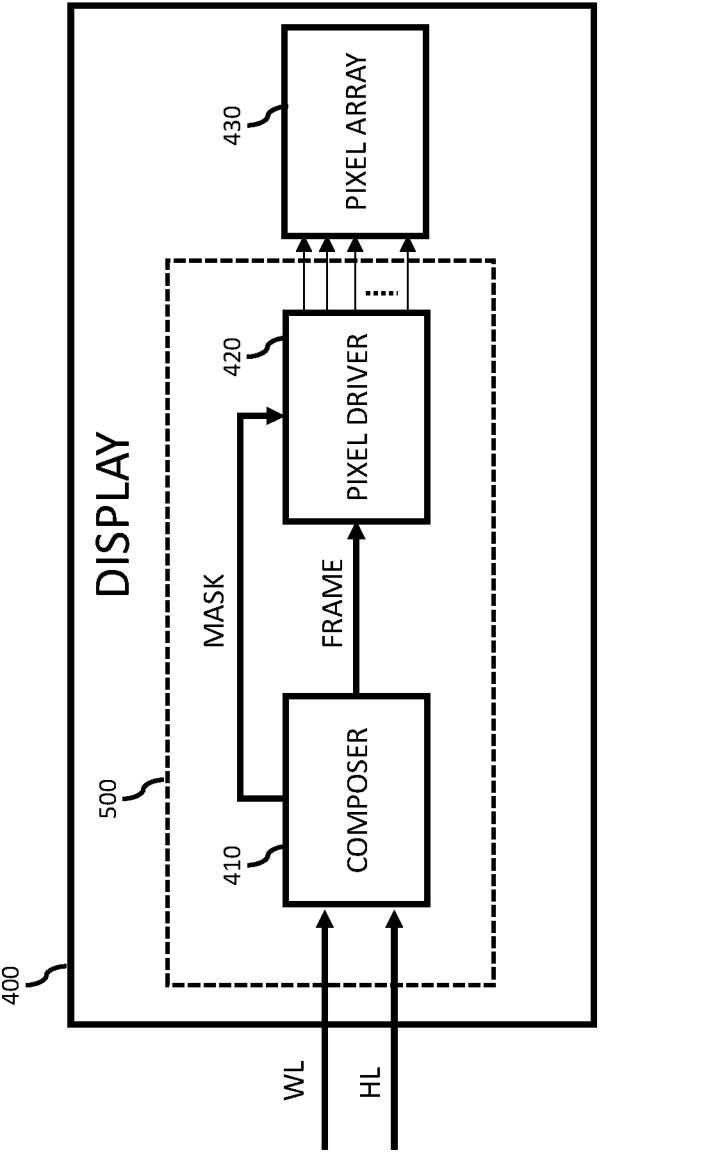
FIG. 4 is a block diagram of a display according to a possible implementation of the present disclosure.

FIG. 4 is a block diagram of a display according to a possible implementation of the present disclosure. In a possible implementation, the display 400 is a heads-up display for a mixed reality device, such as the AR glasses 300, described above. The display 400 is configured to receive multiple data streams. Each data stream can include pixel data and attributes that describe characteristics of the pixel data (e.g., locations, layers, frame rate, resolution, compression gain, etc.). In a possible implementation, the display 400 is configured to receive a first data stream corresponding to world-locked content (WL) and a second data stream corresponding to head-locked content (HL).

The display 400 further includes a display-driver integrated circuit (i.e., system on a chip (SOC)) that includes processing, logic, and electronics to illuminate pixels of a pixel array 430 to display images corresponding to the data streams. The display-driver integrated circuit (i.e., display driver 500) includes a composer configured to combine the world-locked content and the head-locked into a frame based on the pixel data and attributes of the data streams. The display-driver 500 is further configured to generate a mask specifying pixels on the display based on the HL/WL content of the frame.

The mask may control a pixel driver 420 to update the pixels in frame differently. For example, the pixel driver 420 may be configured to receive a mask specifying an area of the pixel array 430. The pixel driver may control pixels in the area of the pixel array differently than pixels that are not in the area of the pixel array. For example, the mask may include a bounding box specifying the pixel in the head-locked content area. The pixel driver may be configured to skip updating pixels in the head-locked content area so that they are updated at a lower frame rate than the pixels in a world-locked content area.

Figure 5:
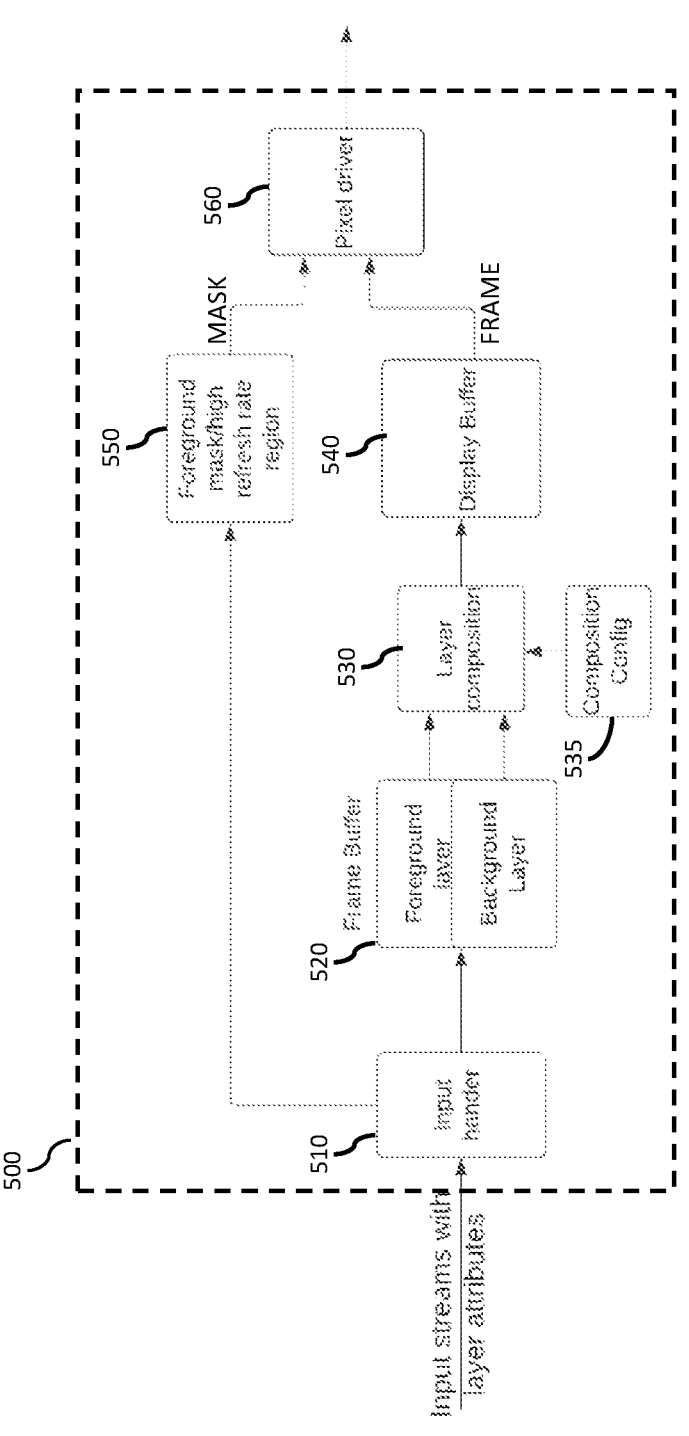
FIG. 5 is a block diagram of a display driver for a display according to a possible implementation of the present disclosure.

FIG. 5 is a block diagram illustrating further detail of the display driver 500. The input streams can be received at an input handler. Based on the layer attributes the input handle can transmit pixel data corresponding to a foreground layer (e.g., world-locked layer) into a foreground layer portion of a frame buffer 520 and pixel data corresponding to a background layer (e.g., head-locked layer) into a background portion of a frame buffer 520. The frame buffer may feed a layer composer 530 which can generate a frame based on the layers and a composition configuration 535, which can specify transparency of the layers for blending. The frame data may be fed to a display buffer 540 until a frame is ready. The frame can then be supplied to a pixel driver that can drive the pixels of a pixel array the appropriate intensities. The pixel driver is configured by the mask generated by a mask generator 550 to drive each pixel in the frame based on its respective position in the pixel array. For example, the mask may configure the pixel driver to update pixels in the head-locked area at a lower refresh rate than pixels in a world-locked area. The pixel driver may also be configured by the mask to drive some adjacent pixels identically to reduce a resolution of head-locked content in a head-locked area. The pixel driver may also be configured by the mask to drive some adjacent pixels identically to increase a level of compression (i.e., compression gain) of the head-locked content in a head-locked area.

Figure 6:
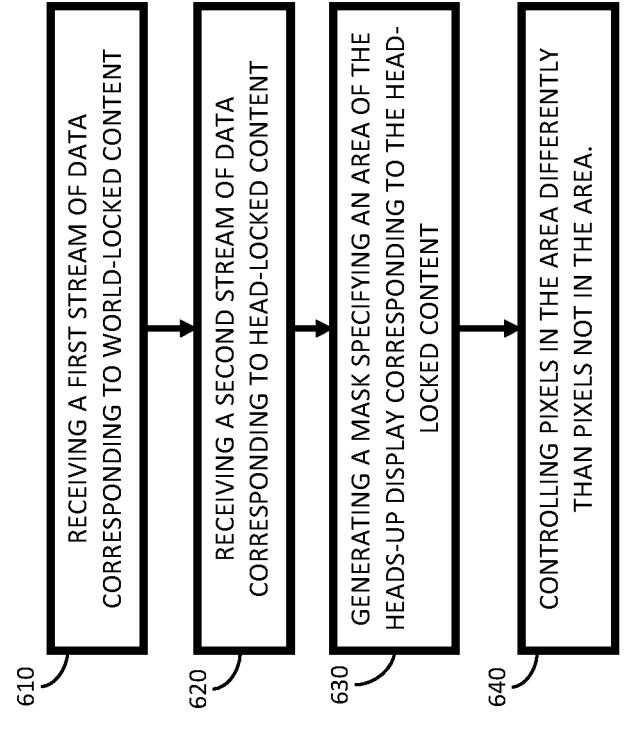
FIG. 6 is a flowchart for a method of displaying content on a heads-up display according to a possible implementation of the present disclosure.

FIG. 6 is a flowchart for a method of displaying content on a heads-up display according to a possible implementation of the present disclosure. The method 600 includes receiving 610 a first stream of data corresponding to world-locked content at the heads-up display. The method 600 further includes receiving 620 a second stream of data corresponding to head-locked content at the heads-up display. The steps of receiving may be performed in parallel, as the head-locked content and the world-locked content can be received as parallel streams of data at different inputs to the heads-up display. The method 600 further includes generating 630 a mask to specify an area of the display corresponding to head-locked content. For example, the mask may specify pixels of a background layer that contain head-locked content. The pixels may be contained within a bounding box, which may be larger than necessary to contain the head-locked content. The method 600 further includes controlling 640 pixels in the area differently than pixels not in the area. For example, pixels in the area may include head-locked content and may be controlled to have one or more of a lower resolution, a lower frame-rate, and a higher compression gain than pixels not in the area.

World-locked content may consume a lot of processing and power resources for rendering. Accordingly, it may be desirable to render this content on a mobile phone or a tablet, which may have more resources than an augmented-reality device. The rendered world-locked content may then be transmitted to the augmented-reality device for display on the heads-up display.

Figure 7:
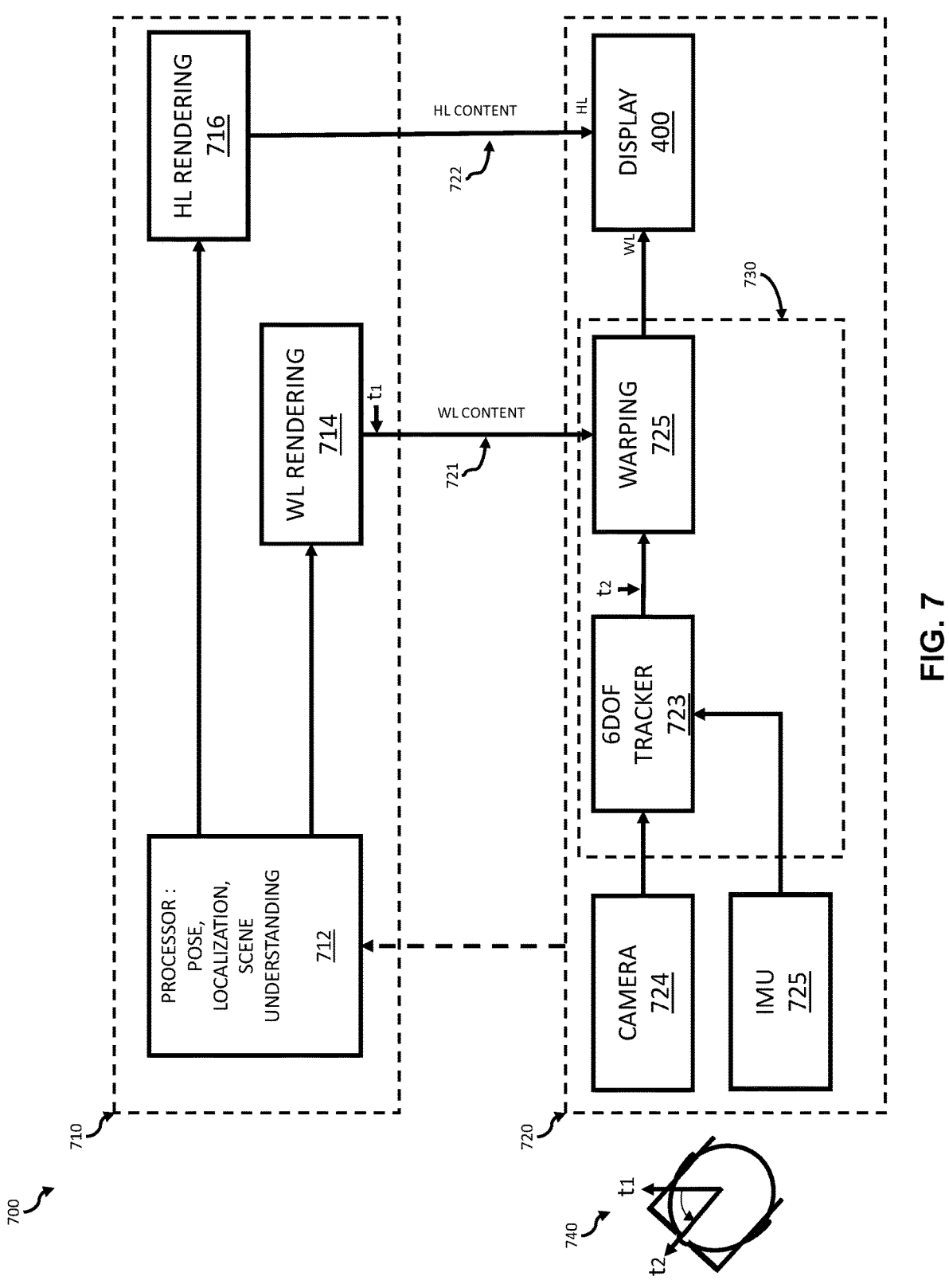
FIG. 7 is a block diagram of an augmented reality system according to a possible implementation of the present disclosure.

FIG. 7 is a block diagram of an AR system according to a possible implementation of the present disclosure. The AR system 700 includes a mobile device 710 and an augmented reality device (e.g., AR glasses 720) that are in wireless communication. The mobile device 712 of a mobile device 710 (e.g., mobile phone, tablet) with data regarding an application (e.g., navigation). A processor 712 of the mobile device 710 is configured to determine information related to a user's position/orientation (e.g., pose), a user's location, and information related to the environment of the user. The processor 712 may receive data to determine this information from a variety of sources, including a web service and/or the AR glasses 720.

The mobile device 710 may include a head-locked rendering module 716 and a world-locked rendering module 714. The head-locked rendering module 716 can render head-locked content configured to not change based on movement of the AR glasses 720. The world-locked rendering module 714 can render world-locked content configured to change based on movement of the AR glasses 720. Accordingly, the world-locked content may be characterized by higher-bandwidth processing and higher-bandwidth communication to accommodate the movement.

The mobile device 710 may be configured to transmit the world-locked content over first communication link 721 and configured to transmit the head-locked content over a second communication link 722. The first communication link 721 may have a higher bandwidth that the second communication link 722. Transmitting the head-locked content over the separate link can reduce the bandwidth required for the first communication link 721.

A user's head may move during the period required for transmitting and displaying the world-locked content, which can lead to a noticeable latency (i.e., lag). To mitigate this lag, the rendered world-locked content can be translated and rotated before displaying according to a late-stage reprojection (i.e., warping 725). The warping 725 adapts the content to the latest position of the AR device (i.e., user's head).

The warping 725 is performed on the AR glasses 720 (e.g., on a system on a chip 730). Power consumed by the AR glasses 720 can be reduced when only the world-locked contents of a frame are warped prior to display. The head-locked contents do not require the late-stage reprojection and so can be fed directly to a HL input of the display 400.

Warping the WL content includes determining a pose of a user and rendering the WL content from a viewpoint according to this pose. A head pose of the user may be described by six degrees of freedom (6DOF), which include position in a three-axis coordinate system (i.e., x, y, z) and rotation in the same three-axis coordinate system (i.e., pitch, roll, yaw). AR glasses 720 can be configured for 6DOF tracking to provide pose information related to the head pose at various times. For example, the 6DOF tracking may include continuously streaming time-stamped head-pose information.

The 6DOF tracking may be performed by a 6DOF tracker 723 that is configured to receive measurements from sensors on the AR glasses 720. For example, the 6DOF tracker 723 (i.e., 6DOF estimator) may be coupled to an inertial measurement unit (IMU 725) of the AR glasses 720. The IMU 725 may include a combination of, at least, an accelerometer, a gyroscope and a magnetometer for measurements of position and acceleration along each of the three dimensions. Alone, the IMU 725 may provide a positioning resolution that is insufficient for world locking the AR clement accurately. For example, the IMU 725 may not provide accurate depth information about the environment, which can help to render the AR element realistically in the environment. Accordingly, the 6DOF tracker may also be coupled to a camera 724 of the AR glasses. The camera 724 can be configured to capture images of the field of view of the user, which can be analyzed to determine depths of surfaces relative to the user in a field of view. This depth information may be used to increase the accuracy of a determined pose of the user. The 6DOF tracking can be highly accurate when both IMU and camera data are used to compute a pose, but can consume a lot of power, especially when cycled at rates necessary to capture fast movements (i.e., fast head movements, fast environment changes) and a camera is used.

The warping 725 translates/rotates the WL content that was rendered based on a pose of the user 740 measured a first time (t1) based on a second pose of the user 740 measured at a second time (t2). The updated world-locked contents are transmitted to a WL input of the display 400

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A system comprising:
a processor configured to warp world-locked content to generate warped world-locked content; and a heads-up display including:
a pixel driver coupled to a pixel array;
a first input configured to receive a first stream of data from the processor corresponding to the warped world-locked content, the warped world-locked content configured to change on the heads-up display based on a movement of the heads-up display;
a second input configured to receive a second stream of data corresponding to head-locked content, the head-locked content configured to not change on the heads-up display based on the movement of the heads-up display; and
a composer coupled to the first input and the second input and configured to:
generate a mask specifying an area including head-locked pixels based on the first stream of data and the second stream of data; and
transmit the mask to the pixel driver to configure the pixel driver to control the head-locked pixels in the area of the pixel array differently than world-locked pixels that are not in the area.

2. The system according to claim 1, wherein the pixel driver is further configured to:
update the world-locked pixels not in the area of the pixel array according to frames at a first frame rate; and
skip updating the head-locked pixels in the area of the pixel array for some of the frames at the first frame rate so that the head-locked pixels in the area are updated at a second frame rate that is less than the first frame rate.

3. The system according to claim 1, wherein the mask is a bounding box containing pixels of the head-locked content.

4. The system according to claim 1, wherein:
the first stream includes a first attribute for the world-locked pixels; and
the second stream includes a second attribute for the head-locked pixels.

5. The system according to claim 4, wherein the composer is further configured to:
generate a first layer based on the first attribute, the first layer corresponding to the world-locked content;
generate a second layer based on the second attribute, the second layer corresponding to the head-locked content; and
combine the first layer and the second layer to generate a frame for display.

6. The system according to claim 1, wherein the pixel driver is configured by the mask to skip updating the head-locked pixels to reduce a frame rate of the head-locked content.

7. The system according to claim 1, wherein the pixel driver is configured by the mask to drive some adjacent head-locked pixels identically to reduce a resolution of the head-locked content.

8. The system according to claim 1, wherein the pixel driver is configured by the mask to drive some adjacent head-locked pixels identically to increase a compression gain of the head-locked content.

9. A method comprising:
warping world-locked content to generate warped world-locked content using a processor of an augmented-reality device;
receiving, from the processor, a first stream of data corresponding to the warped world-locked content at a composer of a heads-up display of the augmented-reality device, the warped world-locked content configured to change on the heads-up display based on a movement of the heads-up display;

receiving a second stream of data corresponding to head-locked content at the composer of the heads-up display, the head-locked content configured to not change on the heads-up display based on the movement of the heads-up display;

generating, using the composer, a mask specifying an area of the heads-up display including head-locked pixels based on the first stream of data and the second stream of data; and transmitting the mask to a pixel driver of the heads-up display to configure the pixel driver to control the head-locked pixels in the area differently than world-locked pixels not in the area based on the mask.

10. The method according to claim 9, wherein the first stream of data and the second stream of data are received at the composer in parallel.

11. The method according to claim 9, wherein pixels not in the area correspond to the world-locked content.

12. The method according to claim 9, wherein controlling the head-locked pixels in the area differently than the world-locked pixels not in the area includes:

updating the world-locked pixels not in the area according to frames at a first frame rate; and skipping updating the head-locked pixels in the area for some of the frames so that the head-locked pixels in the area are updated at a second frame rate that is less than the first frame rate.

13. The method according to claim 9, further comprising:

generating a first layer based on a first attribute received with the first stream of data;

generating a second layer based on a second attribute received with the second stream of data; and combining the first layer and the second layer to generate a frame.

14. The method according to claim 9, wherein controlling the head-locked pixels in the area differently than the world-locked pixels not in the area includes:

driving the world-locked pixels not in the area at a first frame rate; and driving the head-locked pixels in the area at a second frame rate.

15. The method according to claim 9, wherein controlling the head-locked pixels in the area differently than the world-locked pixels not in the area includes:

driving the world-locked pixels not in the area at a first resolution; and driving the head-locked pixels in the area at a second resolution.

16. The method according to claim 9, wherein controlling the head-locked pixels in the area differently than the world-locked pixels not in the area includes:

driving the world-locked pixels not in the area at a first compression gain; and driving the head-locked pixels in the area at a second compression gain.

17. An augmented reality device including:

an inertial measurement unit configured to sense a movement of a user;

a processor configured to:

receive head-locked content and world-locked content; and warp the world-locked content to generate warped world-locked content; and a heads-up display including a composer configured to:

receive a first stream of data corresponding to the warped world-locked content from the processor;

receive a second stream of data corresponding to the head-locked content from the processor;

generate a mask specifying an area on the heads-up display corresponding to the head-locked content; and transmit the mask to a pixel driver, the mask configuring the pixel driver to control pixels in the area differently than pixels not in the area.

18. The augmented reality device according to claim 17, wherein the head-locked content and the world-locked content are received at the processor from a communication link between the augmented reality device and a computing device.

19. The augmented reality device according to claim 17, wherein the processor is further configured to:

warp the world-locked content based on the movement of the user.

* * * * *